United States Patent [19]

Suzuki

[11] 4,201,536

[45] May 6, 1980

[54] VIBRATION RESPONSIVE MECHANISM

[76] Inventor: Eiji Suzuki, 681-5, Oiso, Oiso-machi, Naka-gun, Kanagawa Pref., Japan

[21] Appl. No.: 873,973

[22] Filed: Jan. 31, 1978

[30] Foreign Application Priority Data

Feb. 19, 1977 [JP] Japan .................................. 52-16689

[51] Int. Cl.$^2$ .............................................. F16K 17/36
[52] U.S. Cl. .......................................... 431/88; 116/5; 137/46
[58] Field of Search ............................. 169/54, 56, 60; 340/540, 690; 116/5, 125; 431/33, 34, 88; 137/45, 46

[56] References Cited

U.S. PATENT DOCUMENTS

| 145,870 | 12/1873 | Hille | 431/34 |
| 233,218 | 10/1880 | Donovan | 431/34 |
| 380,129 | 3/1888 | Miller et al. | 431/34 |
| 3,890,993 | 6/1975 | MacNeilage | 137/45 |
| 4,094,332 | 6/1978 | Poff et al. | 137/46 |

Primary Examiner—Robert W. Saifer
Attorney, Agent, or Firm—Cantor and Singer

[57] ABSTRACT

A vibration responsive mechanism having a weight suspension rod pendulum which falls in response to the vibration of a base body. The mechanism comprises a responsive disc secured to said rod normally and coaxially and support balls which contact with and bear against the periphery of the disc, individual set of radial guide races having a biasing means biasing the supporting balls in a centripetal direction and a circular opening through which the responsive disc can pass in a vertical direction and a guide skirt being flared from the inner periphery of a circular opening. This mechanism can be actuated in response not only to horizontal vibration but also to vertical vibration.

13 Claims, 9 Drawing Figures $$F = \frac{W}{n} \sin\theta \cdot \cos(\alpha+\theta) \cdots (1)$$

$$k = \sin\theta \cdot \cos(\alpha+\theta) \cdots (2)$$

$$k' = -\cos(\alpha+2\theta) \cdots (3)$$

$$k' = 0 \Rightarrow \alpha + 2\theta = \frac{\pi}{2} \cdots (4)$$

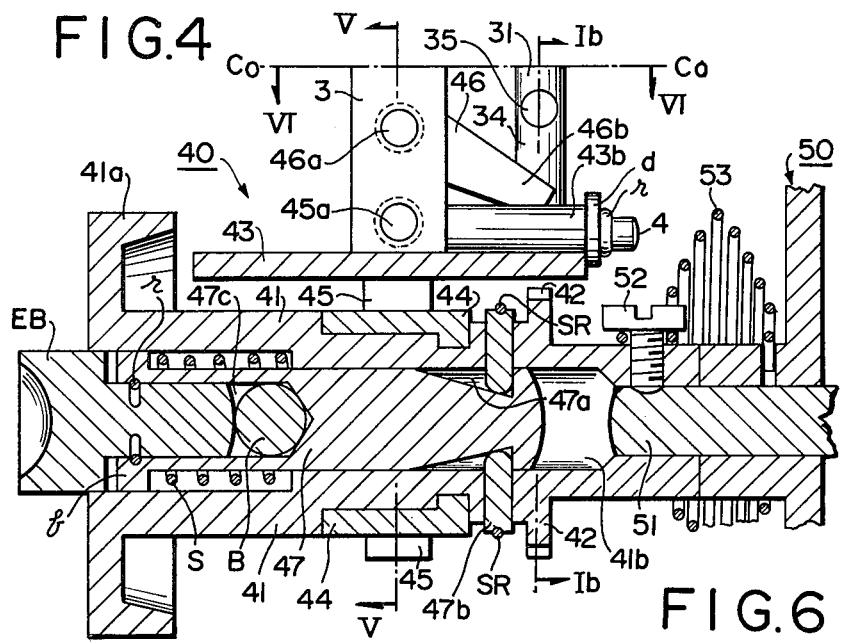
FIG.4
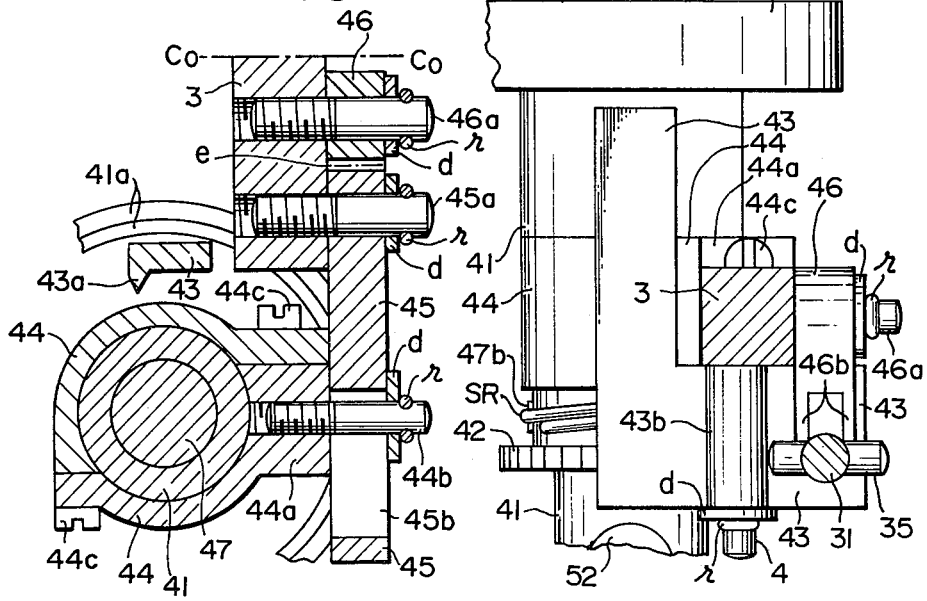
FIG.5
FIG.6

4,201,536

VIBRATION RESPONSIVE MECHANISM

BACKGROUND OF THE INVENTION

The present invention relates to a vibration responsive mechanism for providing a required control output for another device or system to be controlled responsive to vibration such as an earthquake.

In a conventional earthquake responsive automatic fire-extinguishing device mounted on a space heater such as a kerosene heater which is actuated if an abnormal vibration such as an earthquake occurs, there has been widely used an inverted pendulum type vibration responsive mechanism using the fall of a weight. In this case there is an advantage that the response characteristic is stable since the kinematic factors of the pendulum are almost constant. However, this type of device has a disadvantage in that a response to vibration having a great amplitude as a whole, but having a low horizontal amplitude component such as a vertical hypocentre earthquake, can not be expected due to limitations inherent in its mechanism. There is disclosed a system in which a weight falls on a horizontal receptacle having a relatively small area in Japanese Patent Publication No. 19073/1969. This system is principally equivalent to the former system. Accordingly it has also similar advantages and disadvantages. This system will be referred to as a first system, as well as the former system.

There is another system belonging to typical weight suspension pendulum type in which a weight does not fall. For example, Japanese Utility Model Publication No. 39218/1973 discloses a fire-extinguishing system including a weight of a pendulum which is suspended through a coil spring and a permanent magnet in which when the displacement of the weight due to vibration exceeds a predetermined threshold, electrical contacts are closed by a magnetic force for effecting a control output by means of a servo-mechanism which is referred to broadly, as a relay thereby extinguishing the flame. This system will be referred to as a second system. This system can not prevent deterioration with age or deterioration in elasticity of a spring which is constantly subject to a direct load of a weight. However, it has similar advantages comparable to those of the first system in practical use. Furthermore, this has also an advantage that it is responsive to any vibration without the disadvantage involved in the first system. However, this system has two difficulties in maintenance cost and stability of said servomechanism for a long term.

Referring to the social trends relating to afore-mentioned fire-extinguishing systems, the use of a kerosene space heater having no earthquake responsive extinguishing means has been prohibited since July the first, 1977 in Tokyo by revision of fire protection regulations effective on October 1971. When an earthquake of the 4th degree on the seismic scale took place in Tokyo on Dec. 29, 1976, it was found from the records of the Metropolitan Fire Board that only 16% of all said earthquake responsive systems actually actuated in response to the vibration. Although the revised regulations require positive response at the 5th degree on the seismic scale it can be guessed that the response to earthquake is not sufficient yet in consideration of such ratio of responded systems. The Asahi News Paper dated Nov. 7, 1976 said that the Metropolitan Fire Board prepared a search report that there were 2.65 million kerosene space heaters in Tokyo at the end of the year 1975 whereas 1.18 million heaters (44.5%) were not provided with a fire-proof system. On Oct. 22, 1976, a TV news program of NHK reported that the attachment of such a system to currently used kerosene space heaters is technically difficult and the cost of the attachment is relatively high in comparison with the purchase cost of a new kerosene space heater provided with a fire-proof system.

When we consider the recent unusual cold weather and frequent earthquakes in the Northern hemisphere, and the low economical cost of kerosene in comparison with those of the other energy sources, such fire-proof systems must be a problem not only in overpopulated big cities such as Tokyo, or in Japan where there are relatively less fire-and-quake-proof buildings, but is a problem all over the world.

It is, therefore, one object of the present invention is to provide a vibration responsive mechanism which contributes to safety against accidental shock or vibration as well as earthquake, by providing said mechanism with advantages involved by the first and second systems and eliminating all disadvantages.

Another object of the present invention is to provide a vibration responsive mechanism which may readily be attached to a currently used system to be controlled, such as a kerosene space heater for forming an earthquake-proof automatic fire extinguishing device which is responsive to vibrations such as earthquake.

Further, another object of the present invention is to provide a novel type eccentricity variable thrust bearing which engages with and disengages from a thrust shaft in response to a predetermined thrust force and/or changes in an axial angle.

SUMMARY OF THE INVENTION

The subject of the present invention is a vibration responsive mechanism responsible to all vibration modes, including a vibration induced by a vertical hypocentre earthquake having a low horizontal vibration component, said mechanism including as a main component a pendulum which falls from a suspension fulcrum. To form a releasable suspension fulcrum from which the pendulum ascends or descends, this vibration responsive mechanism comprises a responsive disc secured to a rod normally and coaxially therewith, an eccentricity variable thrust ball bearing including at least three support balls which contact with and bear the periphery of said responsive disc in an upward and centripetal direction, and a set of radial guide race having means for biasing individually said balls in a centripetal direction and a central circular opening from which a guide skirt is flared downwardly, said opening having a diameter larger than that of said disc. This responsive mechanism is further provided with a control output mechanism having both functions for providing a system to be controlled with a control output only in response to a fall of the pendulum and for returning the fallen pendulum upward to the vibration responsive position again.

The present invention will be described with reference to the drawings, in which:

BRIEF DESCRIPTION OF THE DRAWINGS

FIG. 4 is a fragmentary sectional view along the line IV—IV of FIG. 1b, showing mainly the relationship between the control output rod shown at the left and upper side of FIG. 1b and an adjustment rod of a system to be controlled which is connected with said rod; and FIG. 5 is a fragmentary sectional view along the line V—V of FIG. 4 and FIG. 6 is a view, partly in section along the line VI—VI of FIG. 4, which is rotated by 90° in a clockwise direction.

PREFERRED EMBODIMENT OF THE INVENTION

Figure 1:
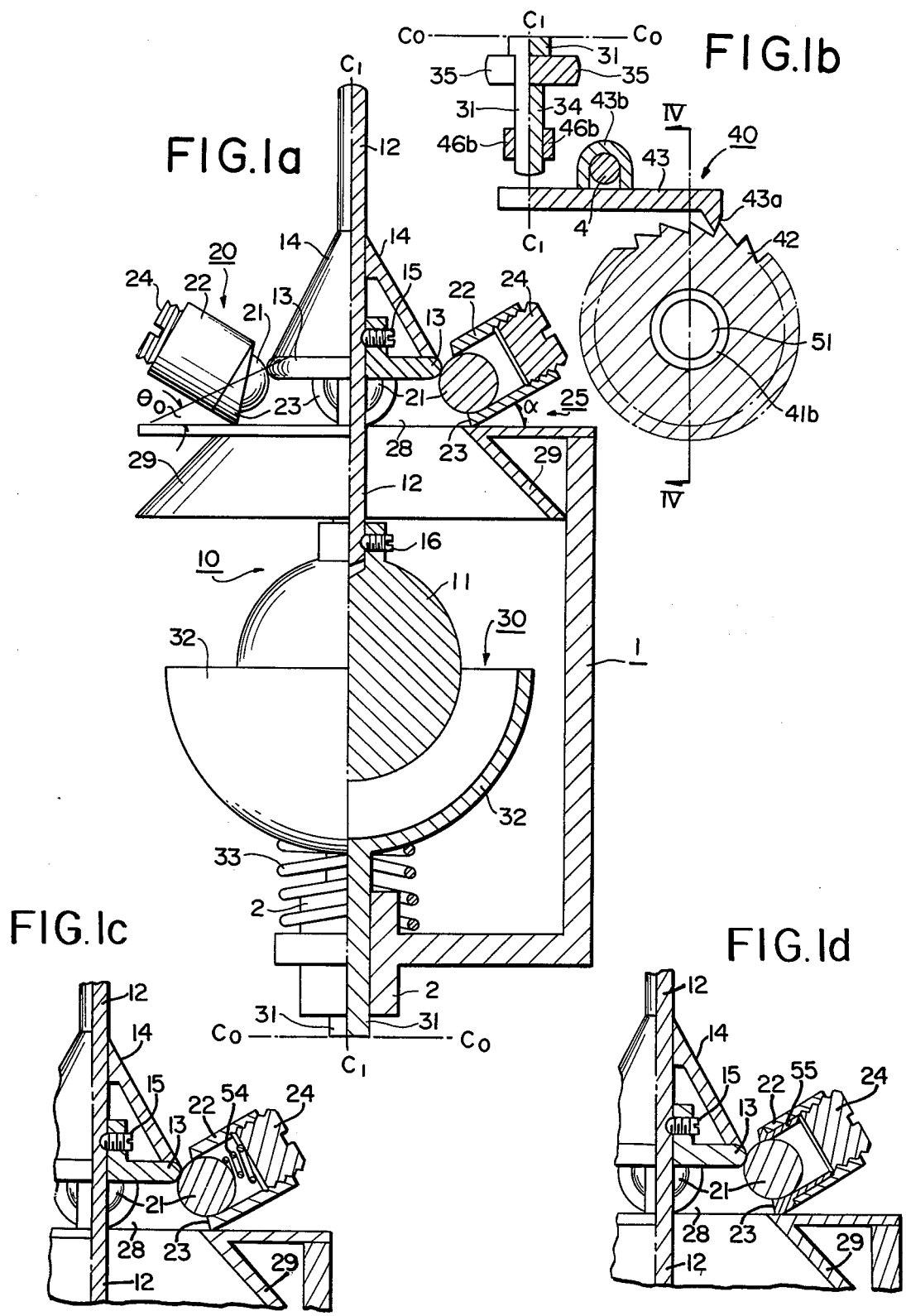
FIGS. 1a and 1b are enlarged elevational views partly in section showing respective upper and lower portions of an embodiment with respect to a line $C_o$—$C_o$ in which a fitting base member is stationary and a pendulum is responsive to vibrations, a weight suspension rod is disposed along the vertical direction and four balls are disposed, a front ball and a race being omitted for the clarity of illustration, the right half side of FIGS. 1a and 1b are vertical sections showing the right half portions of one embodiment.
FIG. 1c is a partially fragmentary vertical section of another embodiment.
FIG. 1d is a partially fragmentary vertical section of still another embodiment.

Referring now to FIG. 1a, a weight suspension rod pendulum which is generally represented as reference numeral 10 has a responsive disc 13 vertically and coaxially secured to a weight suspension rod 12 extending upwardly from a weight 11. A guide cone 14 (which is not essential) is coaxially secured inserted into suspension rod 12 and contact relationship with the upper surface of the disc 13. The guide cone 14 serves to facilitate the smooth upward return of the pendulum 10 from the fallen position to the responsive position. Reference numerals 15 and 16 represents respective clamp screws for fastening the disc 13 and the weight 11 to the suspension rod 12 respectively.

An eccentricity variable thrust ball bearing which is generally shown as 20 forms a removable suspension rod fulcrum. The thrust ball bearing 20 has at least 3 bearing balls 21 which are equally spaced along the periphery of the disc 13. The balls 21 bear the periphery of the disc 13 in a centripetal and upward direction at an equal initial inclination angle $\theta°$ (corresponding to an angle $\theta$ or responsive position which will be hereinafter described with reference to FIG. 2). Radial guide races 22 accommodate respective balls 21 so that they are individually reciprocative only in a radial direction. The race 22 is in the form of tube having an inner diameter slightly larger than that of the ball 21. Biasing means 25 for individually biasing respective balls 21 in a centripetal direction is formed by the fact that the races 22 are at an equal inclination angle $\alpha$ with respect to the horizontal plane and respective balls 21 possess a self-weight. A diameter reduced portion 23 provides a stopper at the centripetal end of the race for the ball 21. The diameter reduced portions 23 are secured to and along the inner periphery of a central circular opening 28 so that they form an integral set of the races 22. This set is secured to a fitting base member 1. The diameter of the circular opening 28 is larger than that of the disc 13. Reference numeral 24 denotes a clamp screw which forms a stopper at the centrifugal end opposite to the diameter reduced portion 23 and reference numeral 29 denotes a guide skirt flared downwardly from the inner periphery of the circular opening 28.

Alternative biasing means such as those shown in FIGS. 1c and 1d could also be used. In the embodiment of FIG. 1c, a coil spring 54 is used as the biasing means. In FIG. 1d, ball 21 is made of a ferromagnetic material and permanent magnet 55 is disposed in the diameter reduced portion 23 of the guide race 22. A combination of both embodiments could be used.

A control output mechanism which is generally indicated by the numeral 30 comprises a control output rod 31 which ascends and descends along the vertical center axis $C_1$—$C_1$ below the pendulum 10; said rod extending through a guide bore 2 bored on the base member 1; a hemispherical weight receptacle 32 upward disposed on the upper end of the control rod 31 in coaxial relationship thereto, said receptacle having at the upper end a diameter larger than the sum of that of the weight 11 and the horizontal amplitude component vibration; a responsive position holding spring 33 between the lower face of the receptacle 32 and the base member 1 for holding the control rod 31 to an illustrated position in which the movement of the pendulum 10 can not be interrupted as long as the pendulum is not released and does not fall from the bearing 20 although the pendulum 10 is vibrated and otherwise the weight 11 may be received in the receptacle 32; and a lift pin 35 (refer to FIG. 1b) horizontally extending through a parallel flat portion 34 at the lower end of the control rod 31.

Referring to FIG. 1b, an adjustment association mechanism which is generally indicated by the numeral 40 is shown as an example of an associated method accomplished by the present invention in a heating power adjustment shaft of a kerosene space heater illustrated as a system to be controlled. The details will be hereinafter described with reference to the FIGS. 4–6.

Figure 2:
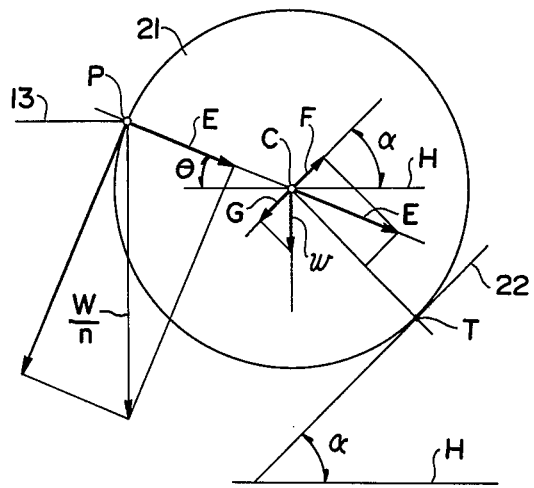
FIG. 2 is an explanatory schematic diagram in which various forces which act upon the contact positions among a principal responsive disc, a ball for supporting the disc, and a radial guide race and respective vectors of their component forces are illustrated together with one of four balls in the eccentricity variable thrust ball bearing of FIG. 1a, part of formulae for representative relationships between various component factors and angles being remarked at the side of this figure.

In FIGS. 2 (enlarged) and 3, the ball 21 is in contact with the disc 13 and the race 22 at points P and T respectively. At the responsive position shown in FIG. 1a, the ball 21 is subject to a component force W/n at point P obtained by dividing with the number of balls n (4 in the illustrated example) a weight W representative of a total weight of the pendulum 10. This force may be divided into a component force E in a direction from point P to point C. Furthermore the component force E may be divided into a component force F parallel to the race 22 in an upward and oblique direction. On the other hand, a component force G of a weight w equal to the weight of the ball 21 itself parallel to the race 22 in a downward and oblique direction will act upon a point C wherein G is a constant, that is represented by w x sin $\alpha$ which is equal to a biasing force of the biasing means 25. Accordingly the ball 21 will move along the race 22 depending upon the difference between component forces F and G. However an inclination angle $\theta$ of the component force E with respect to horizontal plane H equals to the initial inclination angle $\theta_o$ at the position of FIG. 1, that is, the responsive position. The ball 21 is supported and stopped at the illustrated position by the diameter reduced portion 23 under the condition of F<G as well as F=G. The relationships between component forces and angles are represented by formulae (1)–(4) shown at the right side of FIG. 2 and partially shows by a graph of FIG. 3. The actions in association with such relationships will be hereinafter described in detail.

Vibration of the pendulum 10 (including all vibration modes as far as not specially mentioned) causes the movement of point P, that is, change in $\theta$ or disappearance of point P, that is, the separation between the disc 13 and ball 21. Decrease in $\theta$ causes the disc 13 to lose the upward supporting force from the ball 21, or causes the increase of W/n in the other balls which are not shown, that is, F to increase in many cases. On the other hand, the increase in $\theta$ decreases $\theta$ in the other balls 21 or causes the point P to disappear. The disappearance of point P increases W/n in the other ball 21. These changes mean a fact that the pendulum releases and falls down from a bearing 20 when the amplitude of vibration exceeds a predetermined threshold depending upon the mode of vibration.

Figure 3:
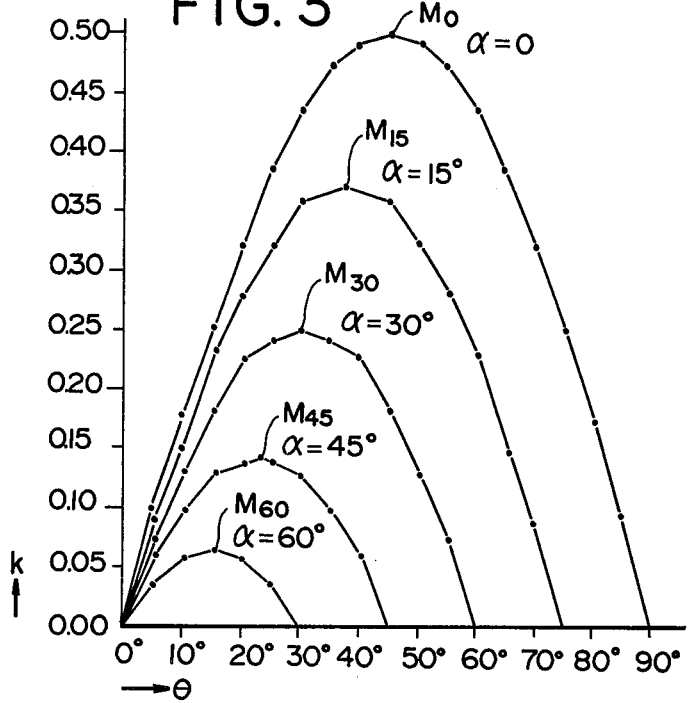
FIG. 3 is a graphical representation of the relation formula (2) in FIG. 2.

It is apparent that FIGS. 2 and 3 show a static model in which any frictions are neglected. On the contrary various factors such as static and dynamic friction and inertial force exist since an actual vibration is a dynamic motion. Therefore, such situations may not happen that if $k \approx 0.00$ as shown at the lower side of FIG. 3, $F \approx 0$, that is, the left disc 13 can not be released from the balls 21. It is considered that practical use in response to earthquake is applicable so far as n is in the order of 4 even if both of horizontal direction of vibration plane and the number of balls 21 have an influence upon the response characteristics of the pendulum 10 in theory. Peak points $M_0$-$M_{60}$ at respective curves in FIG. 3 are maximum values of k at different $\alpha$, which may be readily calculated from both formulae (3) and (4) shown in FIG. 2. (wherein k' is a primary differential coefficient of k and $\pi$ is a radian equivalent to 180°). Thus it is apparent that the recurrence to responsive position of the pendulum 10 is improved by equalizing the initial value $\theta_o$ of $\theta$ to a maximum value corresponding angle (for example $\alpha = 60°$, $\theta_o = 15°$).

Referring now to FIGS. 1b and 4-6, the association mechanism 40 between said control output mechanism 30 and a system 50 to be controlled (kerosene space heater in the illustrated example) will be described.

An associated actuation hollow shaft 41 is coaxially connected with the end of the adjustment shaft 51 shown approximately at the lower side of FIG. 1b and right and lower side of FIG. 4 by means of a fastening screw 52. The actuation hollow shaft 41 is provided with a rotary knob 41a at an end (left side of FIG. 4) opposite the end with which the adjustment shaft 51 is connected. The shaft 41 is bored with a shouldered through-hole 41b along the axis of the shaft 41. A ratchet wheel 42 is formed coaxially with the shaft 41 in the vicinity of the connection end. A pivot shaft 4 for swinging the pawl plate horizontally extends from the lower end of an association mechanism supporting upright post 3 which is suspended from the base member 1. A U-shaped channel member 43b secured to a pawl plate 43 which is relatively long in a horizontal direction having a pawl 43a at one end is loosely fitted to the pivot shaft 4 so that the pivotal movement of the pawl plate 43 may be freely accomplished to engage and disengage the pawl 43a from the ratchet 42.

Cylindrical split sleeve 44 having a step at the inner periphery is assembled and loosely secured to the outer periphery of the association shaft 41 by means of fastening screws 44c. A swinging slide pin 44b is screwed into a projection 44a of the sleeve 44, normal to the axis of the association shaft 41 through an elongated window 45b on a swingable gear arm 45. The gear arm 45 is pivoted to a gear arm swinging pivot shaft 45a. The pivot shaft 45a horizontally extends from approximately the lower end of the strut 3 normal to the pawl plate pivot shaft 4. A forked swingable gear arm 46 which is operatively connected with the gear arm 45 through a gear meshing region e is pivoted to a gear arm swinging pivot shaft 46a. The fork 46b has two branches at the remote end. The branches sandwich a parallel flat portion 34 of the lower end of the control rod 31 so that the control rod 31 is moved upward through the lower surface of a lift pin 35 by a fork 46b or may freely be moved.

A pawl plate releasing push rod 47 is inserted into a through-hole 41b as shown in FIG. 4. The push rod 47 is formed with a flange f at one end and also formed with a circumferential tapered surface 47a in an axial direction in the vicinity of the opposite end. The release rod 47 is normally biased in a left direction in FIG. 4 by a spring S between the flange f and a step of the hole 41b. A plurality of spoke type biasing plates 47b are arranged at equiangular-intervals (90° in the illustrated example) along the periphery of the release rod 47. The biasing plates 47b can move in a radial direction about the axis of the release rod 47. The inner ends of the biasing plates abut the tapered surface 47a of the releasing rod 47 as shown in FIG. 4. A groove (semicircular in the illustrated example) is formed on the outer end of respective spoke plates 47b for bearing the substantial half cross section of a variable diameter loop ring SR at the inner side. The opposite ends of the variable diameter ring SR overlap along the outer periphery of the shaft 41, which is partially shown at the left and lower end of FIG. 6. The tip portions are gradually bent toward the center of the ring (not shown). The overlapped portion has such a long length that the circumference of the ring does not become discontinuous even when the ring diameter is increased by being widened. The overlapped portion is located between adjacent spoke plates 47b.

A blind bore 47c which is bored in the release rod 47 opens at the side of the flange f. A friction reducing ball B is disposed at the innermost end of the blind bore. An emergency push button EB for manually releasing the pawl plate 43 is then loosely fitted into the bore 47c so that it may be freely rotated relative to the release rod 47. The aforementioned fastening screw 52 which is shown at the right side of FIG. 4 also serves to retain one end of a spiral spring 53 to the association shaft 41. The spiral spring 53 has the other end retained to the body of the kerosene space heater by inserting thereinto. In the drawings, reference characters d and r represent a washer and a fastening ring respectively.

The operation will be explained. The action until the fall of the pendulum 10 from the bearing in response to vibration has been described with reference mainly to FIGS. 2 and 3. Subsequent operation and the other functions, for example, return of the pendulum from the fallen position, to responsive position will now be described.

After the pendulum falls, the receptacle 32 which received the weight 11 compresses the holding spring 33 under the load of total weight W of the pendulum and descends downward from the position illustrated in FIG. 1a. The lower end of the control rod 31 depresses the pawl plate 43 to swing it counterclockwise in FIG. 1b. The pawl 43a is then disengaged from the ratchet 42 so that the counterclockwise rotation of the adjustment shaft 51 is allowed thereby to extinguish the kerosene heater.

In order to return the pendulum 10 from the extinguishing position to the responsive position, the knob 41a is manually gripped and the association shaft 41 is pulled from the space heater 50 against the spiral spring 53 to the limit. In other words, the shaft 41 is moved in the left direction in FIG. 4. At the same time, the slide pin 44b of the sleeve 44 slides along the elongated window 45b to the left in FIG. 4 for swinging the gear arm 45 having an elongated window 45b and the fork gear arm 46 about the gear arm pivot shafts 45a and 46a respectively. Finally the front end of the fork having two branches 46b moves upward for elevating the lift pin 35. The control rod 31, and thus the weight 11 in the receptacle 32 is moved upward. The disc 13 is located slightly above the position shown in FIG. 1a. At this time if the handle 41a is released the disc 13 may be gradually returned to the responsive position by the holding spring 33. The afore-mentioned return operation is not limited to the start operation. In other words, it may be accomplished simultaneously with the ignition operation or the heating power adjustment. Furthermore only single return operation may be also possible to render the pendulum 10 responsive at any time. These are apparent from the description of the construction.

Manual emergency fire extinguishment operation may be accomplished by depressing the emergency button EB with respect to the handle 41a (in a right direction in FIG. 4). By this operation, the tapered surface 47a of the release rod 47 pushes the spoke plates 47b in a centrifugal direction so that the diameter of the ring SR is increased and the pawl 43a is lifted. The pawl plate 43 is swung in a counterclockwise direction in FIG. 1b to release the engagement (which is accomplished by a weight proportion of the pawl plate 43, refer to FIG. 6) with ratchet wheel 42. Thus the adjustment shaft 51 may be rotated to an extinguishment position by means of the spiral spring 53.

Adjustment operation for rotating the knob 41a so that the heat power is reduced may be accomplished simultaneously with the depression of the emergency button EB with a finger tip.

The description has been made by way of the illustrated example. The other examples which are defined in the following paragraphs (a)-(c) in which the biasing means 25 is modified may be incorporated within the scope of the following claims. In these cases, linear or non-linear biasing forces act in addition to the fact that a component force G due to self-weight of ball 21 as shown in FIG. 2 is zero or constant. Therefore it is natural that the response of the pendulum 10 is different from that of the illustrated example. However this response characteristic may be made preferable by widening the applicable range of the characteristics depending upon the use.

(a) A coil spring is disposed between the ball 21 and the clamp screw 24, as in FIG. 1c.

(b) A permanent magnet is disposed at the diameter reduced portion 23 and the balls 21 are made of a feromagnetic material, as in FIG. 1d.

(c) The inclination angle α of the race 22 is made zero, that is, the race 22 is horizontally arranged in paragraphs (a) and (b).

Although not shown in the drawings, various modifications of the control output mechanism 30 may be made in the present invention depending upon the structure of the system 50 to be controlled and utilization object. This system 50 to be controlled is not limited to a fire burning device, and may be means of transportation for example.

The advantages and effects of the present invention are summarized in the following:

(1) There is no limitation on the mode of vibration to be responded.

(2) The response characteristics are stable and no servo-mechanism is required.

(3) Attachment to a system to be controlled, that is, modification is easy.

What is claimed is:

1. A vibration responsive mechanism having a weight suspension rod pendulum which falls in response to the vibration of a base body to which said mechanism is mounted, said mechanism comprising:

a responsive disc secured to said rod normally and coaxially therewith, an eccentricity variable thrust ball bearing forming a releasable suspension fulcrum for said pendulum, said thrust ball including at least 3 support balls which contact with and bear the periphery of said responsive disc in an upward and centripetal direction upon the stationary condition of said base body at equal space and at an equal initial inclination angle $\theta_o$ with respect to the horizontal plane, and a set of radial guide races secured to said body for moving said supporting balls in an only radial direction at an equal inclination angle $\alpha$ ($\geq 0$) with respect to the horizontal plane individually, said guide races comprising a biasing means for constantly and individually biasing said supporting ball in a centripetal direction, a circular opening through which said responsive disc can pass in a vertical direction, and a guide skirt being flared from the inner periphery of a circular opening, whereby respective supporting balls individually move along respective radial guide races by the fact that said biasing mechanism generated component forces on respective supporting balls counteract the changes in the component forces applied upon said contact points when the base body is subject to vibration.

2. The vibration responsive mechanism as set forth in claim 1, in which a control output mechanism is disposed for returning the pendulum from a fallen position to a vibration responsive position by the ascent of said mechanism and for providing an external system to be controlled with a control output by the descent in response to the fall of said pendulum.

3. The vibration responsive mechanism as set forth in claim 2, in which said control output mechanism comprises a rod disposed in the base body beneath the pendulum and coaxial therewith and a semispherical weight receptacle having a diameter larger than the sum of the diameter of said pendulum weight and the maximum amplitude at the fall and secured to the upper end of said rod so that said receptacle is located below said weight in vibration responsive position and ascends and descends along the extension of the vertical axis of said pendulum.

4. The vibration responsive mechanism as set forth in claim 1 in which the component force due to self-weight of a ball in said radial guide race is used as said biasing means for said balls.

5. The vibration responsive mechanism as set forth in claim 1 in which said initial inclination angle $\theta_o$ is preset so that the double of the angle $\theta_o$ is substantially complementary angle for said inclination angle $\alpha$ of the guide race, that is, preset to the relation $2\theta_o + \alpha \approx \pi/2$.

6. The vibration responsive mechanism as set forth in claim 1 in which respective balls are made of a ferromagnetic materials as said biasing means and a permanent magnet is disposed at the diameter reduced portion which is formed at the centripetal end of respective guide races.

7. The vibration responsive mechanism as set forth in claim 1, in which a coil spring is disposed at the centrifugal side of the ball as said biasing means.

8. The vibration responsive mechanism as set forth in claim 1 in which at least two biasing means are contained.

9. The vibration responsive mechanism as set forth in claim 1, in which a hollow guide cone of which bottom face is in contacting relationship with the upper surface of said responsive disc is coaxially inserted into said weight suspension rod.

10. A vibration responsive mechanism as set forth in claim 1, said responsive mechanism is operatively connected with an adjustment mechanism in a system to be controlled through an association mechanism.

11. A vibration responsive mechanism as set forth in claim 10, in which a spring biased ratchet wheel and a pawl are used as an association mechanism.

12. The vibration responsive mechanism as set forth in claim 11, in which a manually operated push button for releasing said pawl plate at emergency is provided as association mechanism.

13. A vibration responsive mechanism as set forth in claim 1, in which said system to be controlled is a burner or combustion system to form an earthquake proof automatic extinguisher.

* * * * *